(12) United States Patent
Akiyoshi

(10) Patent No.: US 8,736,635 B2
(45) Date of Patent: May 27, 2014

(54) FIGURE DRAWING DEVICE, ANTI-ALIASING METHOD, AND STORAGE MEDIUM

(75) Inventor: Kenji Akiyoshi, Osaka (JP)

(73) Assignee: NEC System Technologies, Ltd., Osaka (JP)

( * ) Notice: Subject to any disclaimer, the term of this patent is extended or adjusted under 35 U.S.C. 154(b) by 462 days.

(21) Appl. No.: 13/126,518

(22) PCT Filed: Nov. 4, 2009

(86) PCT No.: PCT/JP2009/068852
§ 371 (c)(1),
(2), (4) Date: Apr. 28, 2011

(87) PCT Pub. No.: WO2010/053102
PCT Pub. Date: May 14, 2010

(65) Prior Publication Data
US 2011/0205241 A1    Aug. 25, 2011

(30) Foreign Application Priority Data
Nov. 7, 2008    (JP) .................................. 2008-287184

(51) Int. Cl.
*G09G 5/00*    (2006.01)
(52) U.S. Cl.
USPC .......................................................... 345/613
(58) Field of Classification Search
USPC .......................................................... 345/613
See application file for complete search history.

(56) References Cited

U.S. PATENT DOCUMENTS 5,386,509 A * 1/1995 Suzuki et al. .................. 345/501
5,544,294 A * 8/1996 Cho et al. ....................... 345/441

(Continued)

FOREIGN PATENT DOCUMENTS

| JP | 3-211591 A | 9/1991 |
| JP | 4-139589 A | 5/1992 |

(Continued)

OTHER PUBLICATIONS

International Search Report for PCT/JP2009/068852 mailed Dec. 8, 2009.

*Primary Examiner* — Ryan R Yang
(74) *Attorney, Agent, or Firm* — Sughrue Mion, PLLC

(57) ABSTRACT

The edge segment setting unit (6) sets up edge data for an array of pixel divisions from the coordinates of start and end points of an edge line. The correction unit (7) shifts the array of pixel divisions on the bases of row of pixel divisions arranged in the scanning line direction by a given number of pixels in the scanning line direction. The contraction unit (8) calculates the sums of edge data of pixel divisions within the pre-shift range of the array of pixel divisions on the basis of row of pixel divisions and stores the sums in a column of contracted pixels having a width equal to one pixel division in the scanning line direction. The adjacent pixel adding unit (9) adds the values of the pixel divisions protruding from the pre-shift range of the array of pixel divisions to the column of contracted pixels of the pixel adjacent in the protruding direction. The first mask generation unit (11) generates mask data indicating the fill according to the array of contracted pixels. The occupancy rate calculation unit (12) adds the respective products of the mask data and contracted pixels while shifting a matrix of weighting coefficients to calculate the fill occupancy rate.

11 Claims, 7 Drawing Sheets

(56) References Cited

U.S. PATENT DOCUMENTS

| | | | |
|---|---|---|---|
| 7,369,140 B1* | 5/2008 | King et al. | 345/611 |
| 7,456,846 B1* | 11/2008 | King et al. | 345/613 |
| 7,737,993 B2* | 6/2010 | Kaasila et al. | 345/613 |
| 8,514,243 B2* | 8/2013 | Kaasila | 345/613 |
| 2005/0062758 A1* | 3/2005 | Kaasila et al. | 345/613 |

FOREIGN PATENT DOCUMENTS

| | | |
|---|---|---|
| JP | 5-143742 A | 6/1993 |
| JP | 7-105387 A | 4/1995 |
| JP | 2004227338 A | 8/2004 |

* cited by examiner

FIG. 4
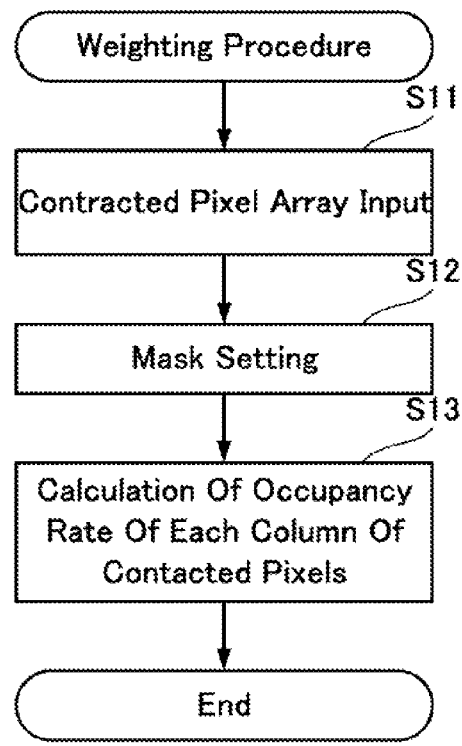
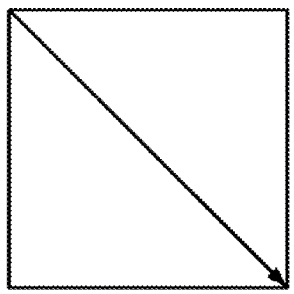
FIG. 5A
Edge Line
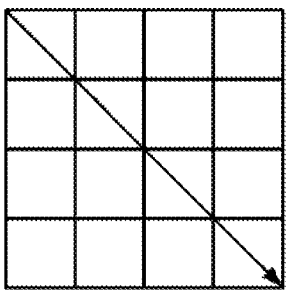
FIG. 5B
Division
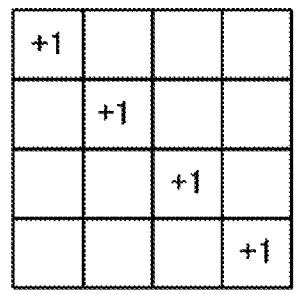
FIG. 5C
Edge Data
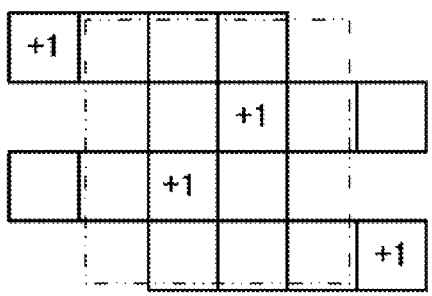
FIG. 5D
Diffusion
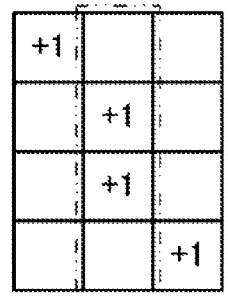
FIG. 5E
Contraction

FIG. 6A

| +1 |    |    |    |
|----|----|----|----|
|    |    | +1 |    |
|    |    |    |    |
|    |    |    |    |

FIG. 6B

|    |    |    |    |
|----|----|----|----|
| +1 |    |    |    |
|    |    |    |    |
|    |    |    |    |

FIG. 6C

|    |    | +1 |    |
|----|----|----|----|
|    | +1 |    | +1 |
|    |    |    | +1 |
|    |    | +1 |    |

| 0   | 1.0 | 0.5 |
|-----|-----|-----|
| 0.5 | 1.5 | 0   |
| 0   | 1.5 | 0.5 |
| 0.5 | 1.0 | 0   |

FIG. 10
| ... | 0/7 | 0.5/7 | 2/7 | 5/7 | 6.5/7 | 7/7 | ... |
FIG. 11
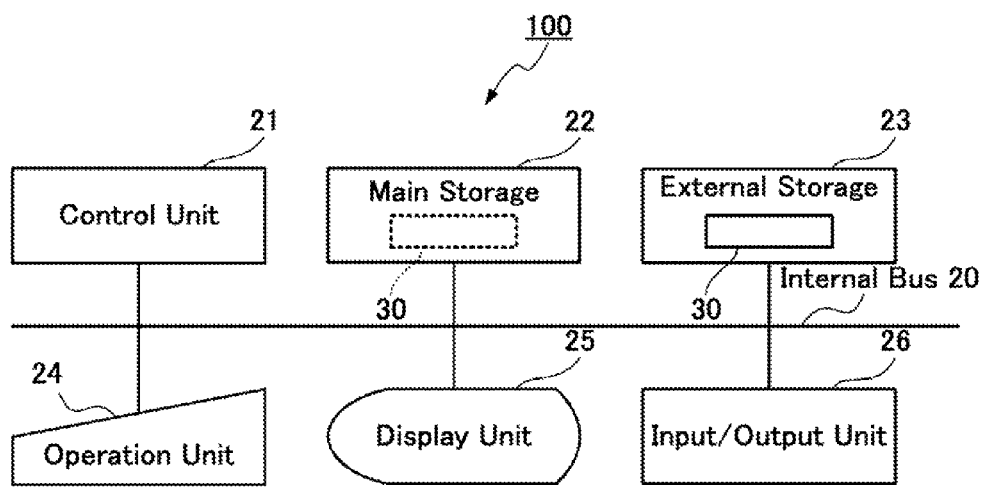
FIG. 12A
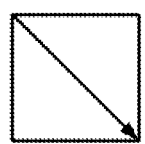
(0,0) – (1,1)
FIG. 12B
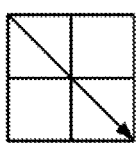
(0,0) – (2,2)
FIG. 12C
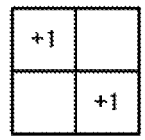
FIG. 12D
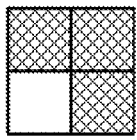
Occupancy Rate = 3/4

(0,0) – (1,1)

(0,0) – (4,4)

Occupancy Rate
= 10/16

FIGURE DRAWING DEVICE, ANTI-ALIASING METHOD, AND STORAGE MEDIUM

TECHNICAL FIELD

The present invention relates to a figure drawing device for drawing images on a display device based on figure data, an anti-aliasing method, and a storage medium.

BACKGROUND ART

For drawing an image based on figure data, the edges of a figure are anti-aliased while filling the pixels enclosed by the edge lines. A pixel is the minimum unit for display. Even if a pixel at an edge of a character or figure partly overlaps another character or figure, the entire pixel must be displayed in one color. However, if the pixels at an edge of a figure have the same color or brightness as the inner pixels, stairstep-like lines clearly appear due to jagging. Then, when an edge of a figure runs through a pixel, the area ratio of the figure overlapping the pixel is calculated and the display color of the dot at the edge part is presented in gradation according to the area ratio (see Patent Literature 1). Such a technique is called anti-aliasing.

In a technique of calculating the overlapping rate of a figure in a pixel at an edge, a pixel is divided into, for example, 4×4 subpixels and the fill region is calculated on the basis of subpixel (for example, see Patent Literature 2). The technique described in the Patent Literature 2 includes the density determination procedure (anti-aliasing procedure) in which a specific anti-aliasing filter (for example, a uniform averaging filter) is applied to the pixels one by one from the first one on the scanning line and the area ratio of each pixel is calculated to obtain a gradation value (namely, density).

In another technique, an area ratio is obtained without dividing into subpixels or counting those to be filled (for example, see Patent Literature 3). The technique described in the Patent Literature 3 comprises a continuity information addition means creating vector data forming the outline of a figure and continuity information indicating the continuity to the vector data and adding it to vector information, a pseudo vector generation means generating a pseudo vector from information on intersections between the scanning lines above and below a scan line and the vector data based on the continuity information of the vector data, and an approximate area ratio calculation means calculating the approximate area ratio of an edge pixel using the fractional part of the X-coordinate value or Y-coordinate value of one of the two intersections formed by the pseudo vector passing through the edge pixel.

In a further other technique, for drawing a figure on a frame buffer over which background image data are spread out, an intermediate color between the color of a first pixel in the background in contact with the edge of a figure and the color of a second pixel at the edge of the figure in contact with the first pixel is calculated and retained in an intermediate color retention region. Then, the color of N consecutive pixels along the edge of the figure in the background including the first pixel is replaced by the intermediate color retained in the intermediate color retention region. Here, N is any integer equal to or greater than 2.

RELATED ART LITERATURE

Patent Literature

[Patent Literature 1] Unexamined Japanese Patent Application KOKAI Publication No. H03-211591;

[Patent Literature 2] Unexamined Japanese Patent Application KOKAI Publication No. H04-139589;

[Patent Literature 3] Unexamined Japanese Patent Application. KOKAI Publication No. H05-143742; and

[Patent Literature 4] Unexamined Japanese Patent Application KOKAI Publication No. 2004-227338.

DISCLOSURE OF THE INVENTION

Problems the Invention is to Solve

For example, for drawing a figure having edge data as shown in FIG. 12A, a pixel is divided into halves in the scanning line direction (X-direction) and in the direction perpendicular thereto (Y-direction) (FIG. 12B) and the outline is detected (FIG. 12C). After the outline is detected, the outline data are scanned from the left to right along the rows of scanning line (Y) to create mask data (FIG. 12D). Then, the occupancy rate is calculated from the 2×2 subpixels. In the example of FIG. 12, the occupancy rate is 3/4.

In the above-described anti-aliasing of a figure, for obtaining a more specific occupancy rate in accordance with the relationship between the edge and pixel, the technique described in the Patent Literature 2 divides a pixel into, for example, 4×4 subpixels as shown in FIG. 13 instead of 2×2 subpixels in FIG. 12B, whereby the increased number of subpixels leads to anti-aliasing with more gradation levels for improved quality. In this way, the outline data capacity is increased by a factor of the square of enlargement ratio (four-fold of FIG. 12 in the example of FIG. 13). Therefore, the outline scan processing time is increased by a factor of the square of enlargement ratio.

The anti-aliasing procedure in which the number of subpixels is equal to the square of the number of divisions has the following problems. For improving the anti-aliasing quality, the outline buffer region having a size of a figure expanded to the number of divisions. Because of increased volumes of writing/reading in/from the outline buffer, the number of accesses to the memory is increased, which causes the performance to drop.

When no subpixels are created as in the technique described in the Patent Literature 3, data for one edge line are not enough to determine the filling. Then, the coordinates of intersections should be held until the mask data are generated. Then, when the mask data are generated, the area ratio should be determined. Therefore, the mask data generation procedure becomes complex. On the other hand, in the technique described in the Patent Literature 4, the gradation does not comply with the area ratio.

The present invention is invented in view of the above circumstances and an exemplary purpose of the present invention is to improve the anti-aliasing quality while suppressing the memory capacity used in anti-aliasing for drawing a figure.

Means for Solving the Problems

The figure drawing device according to the first exemplary aspect of the present invention is characterized by comprising a pixel division array generation unit generating an array of pixel divisions by dividing a pixel through which an edge line of a figure runs by a given number in the horizontal and vertical directions; an edge data setting unit setting up edge data for the array of pixel divisions generated by the pixel division array generation unit, the edge data presenting a pixel division at which filling starts and a pixel division at which the filling ends along the scanning line of a drawing region; a pixel division row shifting unit shifting the array of pixel divisions for which the edge data are set up by the edge data setting unit in the direction of the scanning line on the basis of row of pixel divisions arranged in the direction of the scanning line by a given number of pixel divisions determined for the row of pixel divisions; a contracted pixel column generation unit calculating the sums of the edge data of pixel divisions on the basis of the row of pixel divisions within the pre-shift range of the array of pixel divisions in a set of pixel divisions shifted by the pixel division row shifting unit, and generating a column of contracted pixels storing the sums of edge data, the column of contracted pixels having a width equal to one pixel in the direction of the scanning line and consisting of the number of contracted pixels obtained by dividing in the direction perpendicular to the scanning line; a mask pixel array generation unit generating an array of mask pixels indicating the contracted pixels to be filled from an array of contracted pixels obtained by arranging the columns of contracted pixels generated by the contracted pixel column generation unit according to the array of undivided pixels; an occupancy rate calculation unit calculating the fill occupancy rate of a pixel through which the edge line corresponding to the column of contracted pixels runs from the sum of the products of the column of contracted pixels and adjacent columns of contracted pixels and given weighting coefficients for individual contracted pixels together on the basis of column of contracted pixels of the array of mask pixels generated by the mask pixel array generation unit; a figure drawing unit filling the pixels within the figure with a first gradation and filling the pixels through which the edge line runs with a second gradation that is lower than the first gradation and determined according to the occupancy rate calculated by the occupancy rate calculation unit so as to draw the figure on a display screen.

The anti-aliasing method according to the second exemplary aspect of the present invention comprises a pixel division array generation step generating an array of pixel divisions by dividing a pixel through which an edge line of a figure runs by a given number in the horizontal and vertical directions; an edge data setting step setting up edge data for the array of pixel divisions generated in the pixel division array generation step, the edge data presenting a pixel division at which filling starts and a pixel division at which the filling ends along the scanning line of a drawing region; a pixel division row shifting step shifting the array of pixel divisions for which the edge data are set up in the edge data setting step in the direction of the scanning line on the basis of row of pixel divisions arranged in the direction of the scanning line by a given number of pixel divisions determined for the row of pixel divisions; a contracted pixel column generation step calculating the sums of the edge data of pixel divisions on the basis of the row of pixel divisions within the pre-shift range of the array of pixel divisions in a set of pixel divisions shifted in the pixel division row shifting step, and generating a column of contracted pixels storing the sums of edge data, the column of contracted pixels having a width equal to one pixel in the direction of the scanning line and consisting of the number of contracted pixels obtained by dividing in the direction perpendicular to the scanning line; a mask pixel array generation step generating an array of mask pixels indicating the contracted pixels to be filled from an array of contracted pixels obtained by arranging the columns of contracted pixels generated in the contracted pixel column generation step according to the array of undivided pixels; an occupancy rate calculation step calculating the fill occupancy rate of a pixel through which the edge line corresponding to the column of contracted pixels runs from the sum of the products of the column of contracted pixels and adjacent columns of contracted pixels and given weighting coefficients for individual contracted pixels together on the basis of column of contracted pixels of the array of mask pixels generated in the mask pixel array generation step; a figure drawing step filling the pixels within the figure with a first gradation and filling the pixels through which the edge line runs with a second gradation that is lower than the first gradation and determined according to the occupancy rate calculated in the occupancy rate calculation step so as to draw the figure on a display screen.

The computer-readable storage medium according to the third exemplary aspect of the present invention stores programs that allow a computer to execute a pixel division array generation procedure generating an array of pixel divisions by dividing a pixel through which an edge line of a figure runs by a given number in the horizontal and vertical directions; an edge data setting procedure setting up edge data for the array of pixel divisions generated in the pixel division array generation procedure, the edge data presenting a pixel division at which filling starts and a pixel division at which the filling ends along the scanning line of a drawing region; a pixel division row shifting procedure shifting the array of pixel divisions for which the edge data are set up in the edge data setting procedure in the direction of the scanning line on the basis of row of pixel divisions arranged in the direction of the scanning line by a given number of pixel divisions determined for the row of pixel divisions; a contracted pixel column generation procedure calculating the sums of the edge data of pixel divisions on the basis of the row of pixel divisions within the pre-shift range of the array of pixel divisions in a set of pixel divisions shifted in the pixel division row shifting procedure, and generating a column of contracted pixels storing the sums of edge data, the column of contracted pixels having a width equal to one pixel in the direction of the scanning line and consisting of the number of contracted pixels obtained by dividing in the direction perpendicular to the scanning line; a mask pixel array generation procedure generating an array of mask pixels indicating the contracted pixels to be filled from an array of contracted pixels obtained by arranging the columns of contracted pixels generated in the contracted pixel column generation procedure according to the array of undivided pixels; an occupancy rate calculation procedure calculating the fill occupancy rate of a pixel through which the edge line corresponding to the column of contracted pixels runs from the sum of the products of the column of contracted pixels and adjacent columns of contracted pixels and given weighting coefficients for individual contracted pixels together on the basis of column of contracted pixels of the array of mask pixels generated in the mask pixel array generation procedure; a figure drawing procedure filling the pixels within the figure with a first gradation and filling the pixels through which the edge line runs with a second gradation that is lower than the first gradation and determined according to the occupancy rate calculated in the occupancy rate calculation procedure so as to draw the figure on a display screen.

Advantages of the Invention

The present invention can improve the anti-aliasing quality while suppressing the memory capacity used in anti-aliasing for drawing a figure.

BRIEF DESCRIPTION OF DRAWINGS

FIG. 4 A flowchart showing an exemplary operation of the weighting procedure according to the embodiment;

FIG. 5 An illustration for explaining the anti-aliasing procedure according to an embodiment of the present invention;

FIG. 6 An illustration for explaining exemplary edge data of an array of pixel divisions;

FIG. 7 An illustration for explaining an array of contracted pixels according to an embodiment;

FIG. 8 An illustration for explaining exemplary mask data for an array of contracted pixels;

FIG. 9 An illustration showing exemplary weighting coefficients according to the embodiment;

FIG. 10 An illustration showing exemplary occupancy rates;

FIG. 11 A block diagram showing an exemplary physical configuration for mounting the drawing device on a computer;

FIG. 12 An illustration for explaining an anti-aliasing procedure; and

BEST MODE FOR CARRYING OUT THE INVENTION

Figure 1:
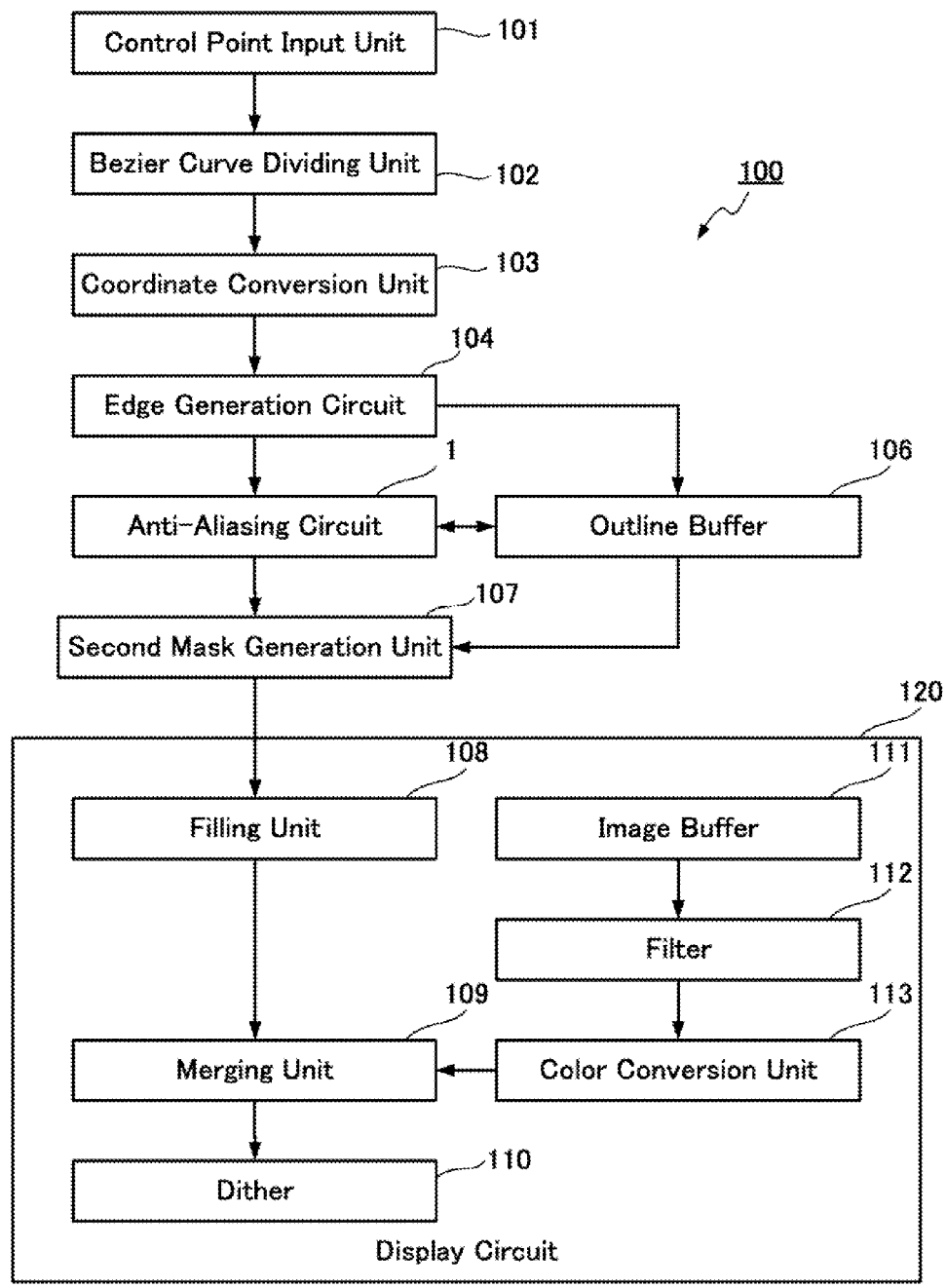
FIG. 1 A block diagram showing an exemplary configuration of a drawing device.

The configuration of the drawing device according to an embodiment of the present invention will be described hereafter with reference to the drawings.

FIG. 1 is a block diagram showing an exemplary configuration of the drawing device according to an embodiment of the present invention.

A drawing device 100 is used to draw figures and generally composed of, as shown in FIG. 1, a control point input unit 101, a Bezier curve dividing unit 102, a coordinate conversion unit 103, an edge generation circuit 104, an anti-aliasing circuit 1, an outline buffer 106, and a display circuit 120.

The control point input unit 101 receives the coordinates of control points of a Bezier curve.

The Bezier curve dividing unit 102 obtains the coordinates of dividing points for approximating polygonal lines of the Bezier curve from the coordinates of control points of the Bezier curve received by the control point input unit 101.

The coordinate conversion unit 103 converts the coordinates of dividing points output from the Bezier curve dividing unit 102 to the coordinates on the entire screen of a display device (not shown) on which the figure is displayed.

The edge generation circuit 104 sets up in the outline buffer 106 edge data presenting the pixels through which the line segments run from the coordinates of dividing points converted by the coordinate conversion unit 103.

The anti-aliasing circuit 1 performs the anti-aliasing procedure based on information on the line segments forming an edge line and is connected to the edge generation circuit 104, outline buffer 106, and display circuit 120.

The anti-aliasing circuit 1 receives edge line information from the edge generation circuit 104, calculates (computes) the fill occupancy rate of pixels at the edge, and outputs occupancy data 16 indicating the occupancy rate to the display circuit 120. Furthermore, the anti-aliasing circuit 1 stores the edge data obtained in the course of calculating the occupancy rate in the outline buffer 106.

Figure 2:
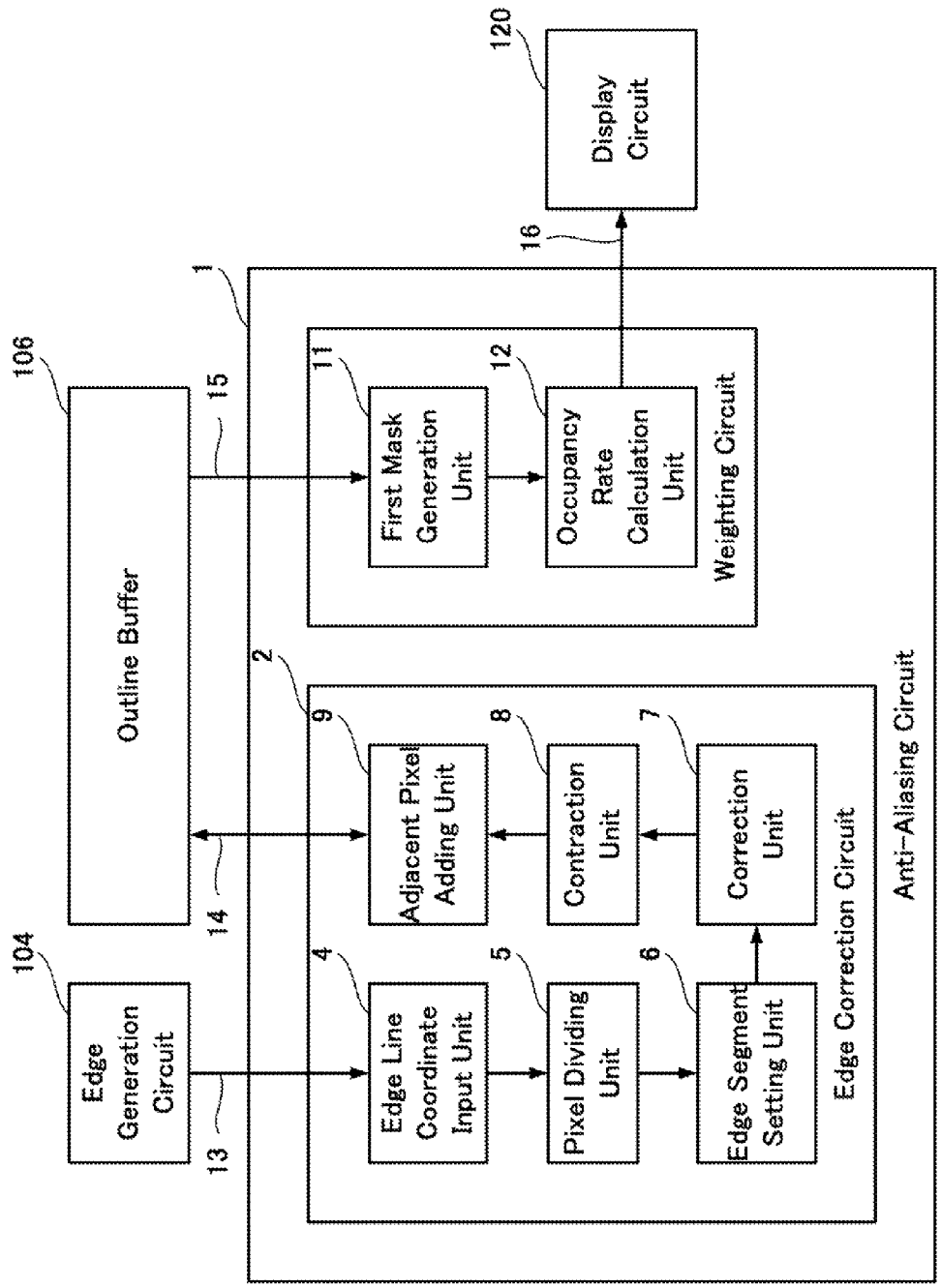
FIG. 2 A block diagram showing an exemplary configuration of the anti-aliasing circuit according to an embodiment of the present invention.

FIG. 2 is a block diagram showing an exemplary configuration of the anti-aliasing circuit.

The anti-aliasing circuit 1 performs the anti-aliasing procedure and is generally composed of, as shown in FIG. 2, an edge correction circuit 2 and a weighting circuit 3.

The edge correction circuit 2 sets up edge data for pixel divisions, contracts the pixel divisions after correction of the edge data, and compresses and stores the pixel division data in the outline buffer 106. The edge correction circuit 2 comprises an edge line coordinate input unit 4, a pixel dividing unit 5, an edge segment setting unit 6, a correction unit 7, a contraction unit 8, and an adjacent pixel adding unit 9.

The edge line coordinate input unit 4 receives the coordinates of start and end points (edge line start/end coordinates 13) of segments forming an edge line from the edge generation circuit 104.

The pixel dividing unit 5 divides at least a pixel through which an edge line runs by a given number to generate an array of pixel divisions.

The edge segment setting unit 6 sets up edge data, namely data indicating the start or end of fill along the scanning line, for the pixel divisions at the positions through which the edge line runs in the array of pixel divisions generated by the pixel dividing unit 5.

The correction unit 7 shifts the array of pixel divisions for which the edge data are set up by the edge segment setting unit 6 by a given number of pixels determined for each row of pixel divisions in the scanning line direction on the basis of row of pixel divisions arranged in the scanning line direction. In this way, some pixel divisions of the rows of pixel divisions remain in the range of the original array of pixel divisions and the others protrude from the range of the array of pixel divisions. Depending on the row of pixel divisions, different pixel divisions remain in or protrude from the range of the original array of pixel divisions.

The contraction unit 8 adds the edge data of the pixel divisions remaining in the range of the original array of pixel divisions on the basis of row of pixel divisions shifted by the correction unit 7. Then, the contraction unit 8 arranges the values obtained by addition on the basis of row of pixel divisions in the direction perpendicular to the scanning line direction to generate a column of values. The storage region retaining the values obtained by addition on the basis of row of pixel divisions is termed a contracted pixel and the contracted pixels arranged in the direction perpendicular to the scanning line in alignment with the array of pixel divisions form a column of contracted pixels.

The adjacent pixel adding unit 9 stores the column of contracted pixels (outline data 14) generated by the contraction unit 8 in the corresponding storage region of the outline buffer 106. Here, since the edge data of a portion of the dispersed row of pixels of the immediately previous pixel that protrudes in the direction of the subsequent pixel are written, the adjacent pixel adding unit 9 adds thereto and sores the data of the current column of contracted pixels.

The adjacent pixel adding unit 9 adds the edge data of pixel divisions protruding from the range of the original array of pixel divisions as a result of the correction unit 7 shifting each row of pixel divisions to the data of the column of contracted pixels of the pixel adjacent in the protruding direction.

More specifically, along the scanning line, the adjacent pixel adding unit 9 reads the column of contracted pixels of the immediately previous pixel (for example, the column of contracted pixels on the left), adds the edge data of the portion of the dispersed row of pixels that protrudes in that direction, and writes it in the original storage region of the outline buffer 106 (the column of contracted pixels of the immediately previous pixel). Furthermore, the adjacent pixel adding unit 9 writes the edge data of the portion of the dispersed row of pixels that protrudes in that direction in the storage region of the column of contracted pixels of the immediately subsequent pixel (for example, the column on the right) along the scanning line.

With the correction unit 7 shifting each row of pixel divisions, the pixel divisions protruding from the pre-shift range of the array of pixel divisions are diffused into the adjacent pixel.

The weighting circuit 3 reads the edge data of the contracted pixel divisions on a scanning line from the outline buffer 106, calculates the occupancy rate of each pixel, and outputs the occupancy rate data 16 indicating the occupancy rate of each pixel to the display circuit 120. The weighting circuit 3 comprises a first mask generation unit 11 and an occupancy rate calculation unit 12.

The first mask generation unit 11 reads the columns of contracted pixels for one line (outline data 15) from the outline buffer 106 and creates mask data in units of contracted pixel from the outline data 15 n-fold in the direction perpendicular to the scanning line.

Using the mask data in units of contracted pixel generated by the first mask generation unit 11, the occupancy rate calculation unit 12 multiplies each contracted pixel of the column of contracted pixels of a pixel to draw and the previous and subsequent columns of contracted pixels by a weighting coefficient and adds them to obtain the occupancy rate of the pixel to draw. Then, the occupancy rate calculation unit 12 outputs the occupancy rate data 16 indicating the calculated occupancy rate of each pixel to the display circuit 120.

The display circuit 120 shown in FIG. 1 fills the pixels within a figure with a reference color (a first gradation color) and fills the pixels through which the edges run with a color having a lower level of gradation than the reference color that is determined in advance according to the occupancy rate indicated by the occupancy rate data 16 so as to draw the figure on the screen of a display device (display screen). The display circuit 120 is composed of, as shown in FIG. 1, a second mask generation unit 107, a filling unit 108, a merging unit 109, a dither 110, an image buffer 111, a filter 112, and a color conversion unit 113.

The second mask generation unit 107 generates mask data from the edge data stored in the outline buffer 106 using the occupancy rate indicated by the occupancy rate data 16 generated by the occupancy rate calculation unit 12.

The filling unit 108 performs the filling procedure according to the mask data generated by the second mask generation unit 107 so as to generate an image of the figure.

For superimposing image data presented by color and brightness data of each pixel of a bit map, such image data are set up in the image buffer 111.

The filter 112 performs procedures such as edge enhancement and singularity removal on the image data set up in the image buffer 111.

The color conversion unit 113 performs color conversion in accordance with the display device on the image data on which the filter 112 has performed edge enhancement and singularity removal.

The merging unit 109 merges the figure image generated by the filling unit 108 and the image presented by the image data on which the color conversion unit 113 has performed color conversion.

The dither 110 generates drawing data by giving the image merged by the merging unit 109 some dither effect that makes the image easy to view on a display device.

The operation (anti-aliasing) of a drawing device having the above configuration will be described hereafter with reference to the drawings.

The edge correction circuit 2 starts the edge correction procedure each time the edge generation circuit 104 generates edge line data of an image of a figure to draw, in which data of columns of contracted pixels are generated and added in the outline buffer 106 for the pixels through which an edge line runs.

Figure 3:
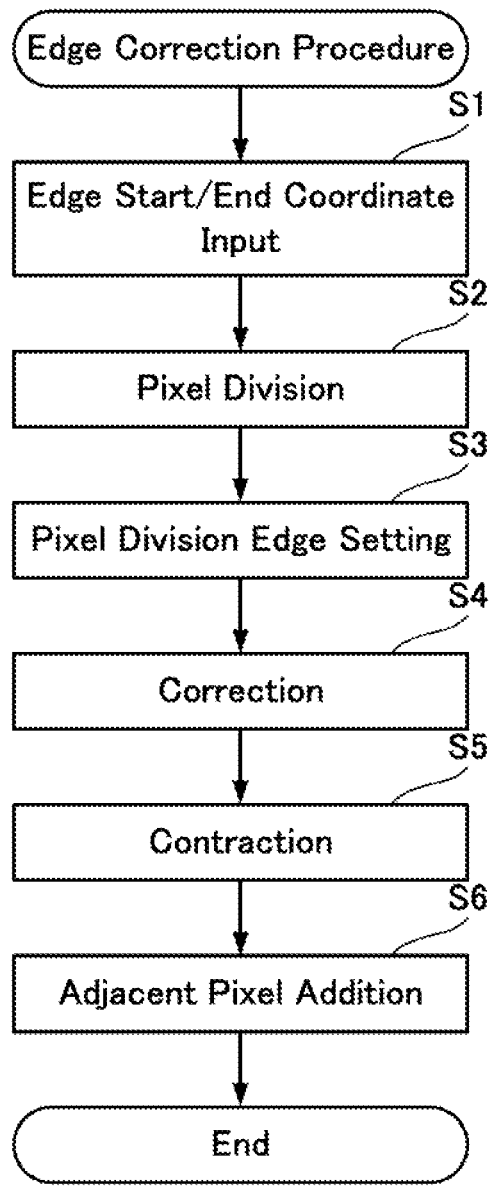
FIG. 3 A flowchart showing an exemplary operation of the edge correction procedure according to the embodiment.
Figure 13A:
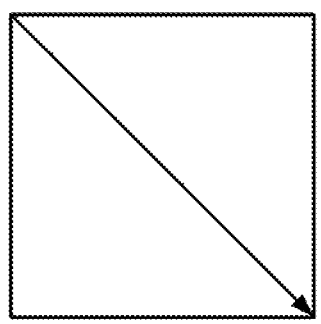
FIG. 13 An illustration for explaining a method of determining a more specific occupancy rate in an anti-aliasing procedure.
Figure 13B:
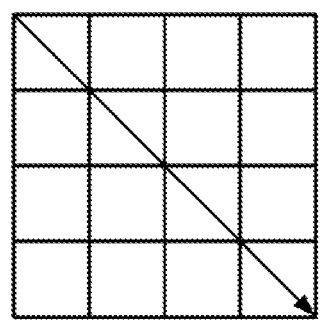
Figure 13C:
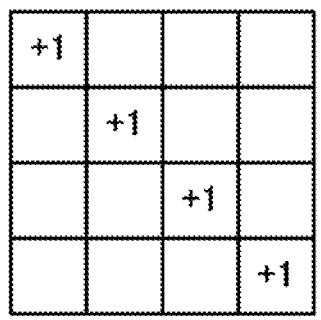
Figure 13D:
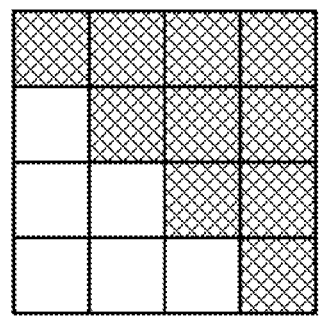

FIG. 3 is a flowchart showing an exemplary operation of the edge correction procedure according to this embodiment.

In the edge correction procedure, first, as shown in FIG. 3, the edge line coordinate input unit 4 of the edge correction circuit 2 receives the coordinates of start and end points (start/end coordinates 13) of each segment of the edge line from the edge generation circuit 104 (Step S1).

Then, the pixel dividing unit 5 divides a pixel through which the edge line run by a given number to generates an array of pixel divisions (Step S2).

Subsequently, the edge segment setting unit 6 sets up edge data for the pixel divisions at the positions through which the edge line runs in the array of pixel divisions generated in Step S2 (Step S3).

Subsequently, the correction unit 7 performs the correction procedure on the array of pixel divisions for which the edge data are set up in Step S3, in which each row of pixel divisions arranged in the scanning line direction is shifted in the scanning line direction by a given number of pixels determined for each row of pixel divisions (Step S4).

Subsequently, the contraction unit 8 adds the edge data of the pixel divisions remaining in the range of the original array of pixel divisions on the basis of row of pixel divisions shifted in Step S4 so as to generate a column of values obtained by addition on the basis of row of pixel divisions and arranged in the direction perpendicular to the scanning line direction (Step S5).

Then, the adjacent pixel adding unit 9 adds and stores the column of contracted pixels generated in Step S5 in the corresponding storage region of the outline buffer 106, and adds and stores the edge data of the pixel divisions protruding from the range of the original array of pixel divisions as a result of shifting of each row of pixel divisions in Step S4 to the data of the column of contracted pixels of the pixel adjacent in the protruding direction (Step S6).

Then, the edge correction circuit 2 determines whether the edge correction procedure is performed on all edge lines on one scanning line and the columns of contracted pixels for the one scanning line are generated. After the edge correction procedure is performed on all edge lines on one scanning line (after the columns of contracted pixels for one scanning line are generated), a drawing start instruction is issued to the weighting circuit 3.

Here, after the columns of contracted pixels for one scanning line are generated, a drawing start instruction is issued to the weighting circuit 3. Here, the columns of contracted pixels for one line have a data structure in which the original row of pixels is increased n-fold in the direction perpendicular to the scanning line. The values in a column of contracted pixels include a positive value and a negative value presenting the fill start pixel and fill end pixel along a scanning line in the drawing region, respectively.

Then, the weighting circuit 3 performs the weighting procedure on the outline data of the scanning line when a drawing start instruction is issued by the edge correction circuit 2.

FIG. 4 is a flowchart showing an exemplary operation of the weighting procedure according to this embodiment.

In the weighting procedure, as shown in FIG. 4, first, the first mask generation unit 11 of the weighting circuit 3 receives a array of contracted pixels (the outline data 15) for one line from the outline buffer 106 (Step S11).

Then, the first mask generation unit 11 creates mask data in units of contracted pixel from the received outline data 15 that are increased n-fold in the direction perpendicular to the scanning line (Step S12).

Subsequently, the occupancy rate calculation unit 12 multiplies each contracted pixel of the column of contracted pixels of a pixel to draw and the previous and subsequent columns of contracted pixels by a weighting coefficient and adds them to obtain the occupancy rate of the pixel to draw, and outputs the occupancy rate data 16 indicating the calculated occupancy rate of each pixel to the display circuit 120 (Step S13).

Then, the second mask generation unit 107 of the display circuit 120 generates mask data from the edge data using the occupancy rate indicated by the occupancy rate data 16 generated in Step S13. Then, the filling unit 108 performs the filling procedure according to the mask data.

Consequently, the pixels within the figure are filled with a reference color and the pixel through which an edge line runs are filled with a color having a lower level of gradation than the reference color that is determined in advance according to the occupancy rate indicated by the occupancy rate data 16 so as to draw the figure on the screen of a display device.

The operation (anti-aliasing) of a drawing device performing the above procedures will be described hereafter using a specific example.

For example, when a pixel through which an edge line as shown in FIG. 5A runs is generated by the edge generation circuit 104, first, the edge line coordinate input unit 4 receives the coordinates of start and end points of the edge line running through the pixel (Step S1 in FIG. 3).

Then, the pixel dividing unit 5 divides the pixel shown in FIG. 5A into quarters horizontally (in the scanning line direction) and vertically to generate an array of pixel divisions as shown in FIG. 5B (Step S2 in FIG. 3). A square division corresponds to a pixel division in the example shown in FIG. 5B.

In the example shown in FIG. 5B, the edge line is a diagonal line running from the top left corner to the bottom right corner of the pixel. Then, the edge segment setting unit 6 sets up edge data for the pixel divisions on the diagonal line along which the edge line runs as shown in FIG. 5C (Step S3 in FIG. 3). In the example in FIG. 5C, the pixel divisions having a value of 0 are shown in blank. Presented by +1, the edge data indicate that filling starts (or ends) at that pixel division.

Depending on the position of an edge line running through a pixel, the positions of pixel divisions for which edge data are set up vary. For example, when an edge line runs from the top left corner to the midpoint of the right side of a pixel, the edge data as shown in FIG. 6A are set up. When an edge line runs from the top left corner to the midpoint of the bottom side of a pixel, the edge data as shown in FIG. 6B are set up. When two edge lines run, the edge data as shown in FIG. 6C are set up.

Subsequently, the correction unit 7 performs the correction procedure as shown in FIG. 5D in which the rows of pixel divisions are shifted on the basis of row alternately from the top by one pixel division in the negative direction of the scanning line, by one pixel division in the positive direction of the scanning line, by one pixel division in the negative direction of the scanning line, and by one pixel division in the positive direction of the scanning line (Step S4 in FIG. 3). In the example shown in FIG. 5D, the dash-dot-dot line indicates the pre-shift range of the columns of pixel divisions. Here, the pixel divisions protruding from the pre-shift range of the columns of pixel divisions are diffused into the adjacent pixels.

Subsequently, the contraction unit 8 adds the edge data in the range enclosed by the dash-dot-dot line shown in FIG. 5D in the horizontal (scanning line) direction on the basis of row of pixel divisions as shown in FIG. 5E. In the example shown in FIG. 5E, the range enclosed by the dash-dot-dot line indicates a column of contracted pixels. Here, the edge data in the first and fourth rows of pixel divisions protrude from the range of the original array of pixel divisions. Therefore, the first and fourth rows of the column of contracted pixels have a value of 0.

Then, when there is no edge data in the portion protruding from the immediately previous pixel in the positive direction of the scanning line (the column of contracted pixels of a pixel currently in process has 0) and the column of contracted pixels on the left has data of 0, the adjacent pixel adding unit 9 writes the value of the center column shown in FIG. 5E in the column of contracted pixels of the pixel currently in process, the value of the left column shown in FIG. 5E in the left column, and the value of the right column shown in FIG. 5E in the right column as they are in the corresponding storage region of the outline buffer 106. As a result of shifting on the basis of row of pixel divisions, the pixel divisions protruding from the pre-shift range of the array of pixel divisions are diffused into the adjacent pixels.

Consequently, in the outline buffer 106, the column of contracted pixels of the pixel currently in process is arranged in the unit enclosed by the dash-dot line, the column of contracted pixels of the immediately previous pixel is arranged in the left column, and the column of contracted pixels of the immediately subsequent pixel is arranged in the right column as shown in FIG. 7.

After the columns of contracted pixels for one scanning line are generated as described above, a drawing start instruction is issued to the weighting circuit 3. First, the first mask generation unit 11 reads the columns of contracted pixels for one line (the outline data 15) from the outline buffer 106 (Step S11 in FIG. 4).

Then, the first mask generating unit 11 starts filling from the contracted pixel having edge data of +1 shown in FIG. 7 based on the outline data 15 that is increased n-fold in the direction perpendicular to the scanning line and creates mask data in units of contracted pixel in which the hatched contracted pixels to be filled are given mask data of 1 and the contracted pixels not to be filled are given mask data of 0 (S12 in FIG. 4). Here, the mask data shown in FIG. 8 corresponds to the array of contracted pixels shown in FIG. 7. For example, the mask data enclosed by the dash-dot line shown in FIG. 8 corresponds to the contracted pixels enclosed by the dash-dot line shown in FIG. 7.

Subsequently, in Step 13 of FIG. 4, using a matrix of weighting coefficients consisting of coefficients for multiplying the values in the center column enclosed by the dash-dot-dot line by the column of contracted pixels of a pixel of interest, coefficients for multiplying the values in the left column by the column of contracted pixels of the immediately previous pixel to the pixel of interest, and coefficients for multiplying the values in the right column by the column of contracted pixels of the immediately subsequent pixel to the pixel of interest as shown in FIG. 9, the occupancy rate calculation unit 12 multiplies the coefficients and the mask data of the corresponding columns of contracted pixels together while shifting the matrix so that the column of contracted pixels of the pixel of interest is positioned in the center (indicated by the dash-dot-dot line), and calculates the total (=5 (=(1.0+0.5)+(1.5)+(1.5+0.5)).

Here, among the weighting coefficients shown in FIG. 9, the coefficients for the contracted pixels in the direction of shifting the rows of pixel divisions are 0 and the coefficients for those in the other direction are 0.5. This is because the mask data are so generated as to start or end at edge data along a scanning line and, in the above way, a coefficient for including the edge data diffused into the adjacent pixel and a coefficient for excluding them appear alternately from the top in the rows of weighting coefficients. Then, the weighting coefficients shown in FIG. 9 serve to set up a proper occupancy rate in accordance with diffusion of the edge data into the adjacent pixels as shown in FIG. 5D.

Subsequently, in Step S13 of FIG. 4, the occupancy rate calculation unit 12 divides the total value by the sum of coefficients (7 (=1.0+0.5)+(0.5+1.5)+(1.5+0.5)+(0.5+1.0))) in the example shown in FIG. 9) to obtain the occupancy rate (=5/7) of the pixel.

FIG. 10 is an illustration showing the values (occupancy rates) calculated in accordance with the mask data shown in FIG. 8 using the weighting matrix shown in FIG. 9. In the example shown in FIG. 10, the data enclosed by the dash-dot line indicate the occupancy rate (=5/7) of the pixel of the column of contracted pixels enclosed by the dash-dot line shown in FIGS. 8 and 9.

As shown in FIG. 10, the immediately previous (left) pixel to the pixel enclosed by the dash-dot line has four contracted pixels having mask data of 1 and therefore has an occupancy rate of 2/7. On the other hand, the second pixel preceding the pixel of interest has only one contracted pixel having mask data of 1 at the top right of the matrix of weighting coefficients and therefore has an occupancy rate of (0.5)/7. Furthermore, the mask data of the preceding pixel are all zero and has an occupancy rate of 0.

On the other hand, the immediately subsequent (right) pixel to the pixel enclosed by the dash-dot line has only one contracted pixel having mask data of 0 at the bottom left and therefore has an occupancy rate of (6.5)/7. Furthermore, the second pixel subsequent to the pixel of interest has an occupancy rate of 7/7=1.

Then, in Step S13 of FIG. 4, the occupancy rate calculation unit 12 outputs the occupancy rate data 16 indicating the calculated occupancy rate of each pixel to the display circuit 120.

Then, the display circuit 120 fills the pixels within the figure with a reference color and fills the pixels through which the edge line runs with a color having a lower level of gradation than the reference color that is determined in advance according to the occupancy rate indicated by the occupancy rate data 16 so as to draw the figure on the screen of a display unit.

As described above, the anti-aliasing circuit 1 of this embodiment has the following effects.

The first effect is that the correction of the coordinates after generation of edge data and calculation of the occupancy rate with weighting improves the quality of anti-aliasing without increasing the capacity of the outline buffer.

More specifically, in the example shown in FIGS. 5 and 7, the column of contracted pixels is increased from the original pixel fourfold in the direction perpendicular to the scanning line. Then, the data in the outline buffer 106 are increased fourfold from the original pixel. This is the same data volume as in the outline buffer in the case of FIG. 12. On the other hand, the occupancy rate has four gradation levels in the example shown in FIG. 12 while the gradation is increased to 7 levels in the example shown in FIGS. 5 and 7. In this embodiment, the quality of anti-aliasing can be improved by increasing the gradation levels of pixels without increasing outline data.

The second effect is that because the capacity of the outline buffer is not increased, the number of accesses to the memory is the same as before the quality is improved. Then, the quality of anti-aliasing can be improved without reducing the drawing speed.

The present invention is not confined to the above embodiment and various modifications and applications are available. Modifications of the above embodiment applicable to the present invention will be described hereafter.

For example, the number of divisions of a pixel created by the pixel dividing unit 5 and the number of pixel divisions by which each row of pixel divisions is shifted by the correction unit 7 are not limited to the numbers referred to in the explanation of the embodiment and can be any numbers. For example, the number of divisions can be n in each of the horizontal and vertical directions. In such a case, the outline buffer 106 is increased n-fold, not by a factor of the square of n. Furthermore, the divisions can be shifted by two or more divisions. Even in such a case, the data of the pixel divisions protruding from the pre-shift range of the array of pixel divisions are added to a column of contracted pixels of the pixel adjacent in each protruding direction. The weighting coefficients are set up according to the number of divisions and the number of pixel divisions to shift; then, an anti-aliasing procedure for proper display can be performed.

The display device 100 according to this embodiment can be realized by a hardware configuration similar to a conventional computer device.

FIG. 11 is a block diagram showing an exemplary physical configuration for mounting the drawing device on a computer.

The anti-aliasing circuit 1 constitutes a unit of the drawing device 100 as explained with reference to FIG. 1.

The drawing device 100 comprises, as shown in FIG. 11, a control unit 21, a main storage 22, an external storage 23, an operation unit 24, a display unit 25, and an input/output unit 26. The main storage 22, external storage 23, operation unit 24, display unit 25, and input/output unit 26 are connected to the control unit 21 via an internal bus 20.

The control unit 21 is composed of a CPU (central processing unit) or the like and executes the drawing process including the anti-aliasing procedure according to programs 30 stored in the external storage 23.

The main storage 22 is composed of a RAM (random access memory) or the like. With the programs 30 stored in the external storage 23 being loaded, the main storage 21 is used as the working area of the control unit 21. The above-described outline buffer 106 is configured in the main storage 22.

The external storage 23 is composed of a nonvolatile memory such as a flash memory, hard disc, DVD-RAM (digital versatile disc-random access memory), and DVD-RW (digital versatile disc-rewritable). The external storage 23 stores the programs 30 for the control unit 21 to execute the above-described procedures in advance. Furthermore, the external storage 23 supplies to the control unit 21 data stored by the programs 30 according to instructions from the control unit 21 and stores data supplied from the control unit 21.

The operation unit 24 is composed of a keyboard and a pointing device such as a mouse and an interface device for connecting the keyboard and pointing device to the internal bus 20. Instructions on creation, input, and transmission/reception of image data including Bezier curves, designation of an image to display, drawing region ranges, enlargement ratios, and positions of drawing regions on the display device are entered via the operation unit 24 and supplied to the control unit 21.

The display unit 25 is composed of a CRT (cathode ray tube) or LCD (liquid crystal display) and displays a drawn image.

The input/output unit 26 is composed of a radio transmission/reception device, wireless modem, or network terminal device, and an serial interface or LAN (local area network) interface connected thereto. Image data including Bezier curves are received or transmitted via the input/output unit 26.

The drawing device 100 including the anti-aliasing circuit 1 of the present invention can be configured as an electronic circuit by mounting a circuit composed of a hardware unit such as an LSI (large scale integration) in which an circuit realizing the above-described anti-aliasing procedure is installed. Furthermore, the programs 30 for fulfilling the above functions can be executed by the control unit 21 on a computer processing device to realize the drawing device 100. In such a case, the CPU of the control unit 21 loads the programs 30 stored in the external storage 23 onto the main storage 22 and executes them so as to control the operations of the units and fulfill the functions, thereby executing the procedure of the anti-aliasing circuit 1.

Here, the core unit for executing the processing of the drawing device 100 composed of the control unit 21, main storage 22, external storage 23, operation unit 24, input/output unit 26, and internal bus 20 can be realized by a conventional computer system, not by a dedicated system. For example, the computer programs for executing the above-described operations are distributed in a computer-readable recording medium (such as a flexible disc, CD-ROM, and DVD-ROM) and installed on a computer so as to configure the drawing device 100 for executing the above-described procedures. Alternatively, the computer programs can be stored in a storage device of a server device on a communication network such as the Internet, and downloaded by a convention computer system to configure the drawing device 100.

Alternatively, for realizing the functions of the drawing device 100 by apportionment between an OS (operation system) and application programs or by cooperation of an OS (operation system) and application programs, only the application programs can be stored in a recording medium or storage device.

Furthermore, the computer programs can be superimposed on carrier waves to distribute them via a communication network. For example, the computer programs can be posted on a bulletin board system (BBS) of a communication network to distribute them via the network. Then, the computer programs can be activated and executed in a manner similar to other application programs under the control of an OS so that the above-described procedures are executed.

Additionally, the above-described hardware configuration and flowcharts are given by way of example and any modifications and adjustments can be made.

Additionally, preferable modifications of the present invention include the following configuration.

The figure drawing device according to the first exemplary aspect of the present invention is preferably characterized in that the pixel dividing unit 5 divides a pixel through which an edge line runs into quarters in each of the horizontal and vertical directions and the correction unit 7 shifts the rows of pixel divisions on the basis of row by one pixel division in the negative or positive direction of the scanning line direction.

It is more preferably characterized in that the occupancy rate calculation unit 12 divides the total of the sum of the respective products of the contracted pixels of the column of contracted pixels adjacent to a column of contracted pixels in the negative direction of the scanning line and 0, 0.5, 0, 0.5, the sum of the respective products of the contracted pixels of the column of contracted pixels and 1.0, 1.5, 1.5, 1.0, and the sum of the respective products of the contracted pixels of the column of contracted pixels adjacent to the column of contracted pixels in the positive direction of the scanning line and 0.5, 0, 0.5, 0 by 7 to obtain the fill occupancy rate of the pixel.

The anti-aliasing method according to the exemplary second aspect of the present invention is preferably characterized in that in Step S2 of FIG. 3, the pixel dividing unit 5 divides a pixel through which an edge line runs into quarters in each of the horizontal and vertical directions and in Step S4, the correction unit 7 shifts the rows of pixel divisions on the basis of row by one pixel division in the negative or positive direction of the scanning line direction.

It is more preferably characterized in that in Step S13 of FIG. 4, the occupancy rate calculation unit 12 divides the total of the sum of the respective products of the contracted pixels of the column of contracted pixels adjacent to a column of contracted pixels in the negative direction of the scanning line and 0, 0.5, 0, 0.5, the sum of the respective products of the contracted pixels of the column of contracted pixels and 1.0, 1.5, 1.5, 1.0, and the sum of the respective products of the contracted pixels of the column of contracted pixels adjacent to the column of contracted pixels in the positive direction of the scanning line and 0.5, 0, 0.5, 0 by 7 to obtain the fill occupancy rate of the pixel.

The present application is the National Phase of PCT/JP2009/068852, filed Nov. 4, 2009, which is based on the Japanese Patent Application No. 2008-287184 filed on Nov. 7, 2008, of which the specification, scope of claims, and figures are entirely incorporated herein by reference.

INDUSTRIAL APPLICABILITY

The present invention is applicable to various techniques for drawing images on a display device based on figure data.

LEGEND

1 anti-aliasing circuit
2 edge correction circuit
3 weighting circuit
4 edge line coordinate input unit
5 pixel dividing unit
6 edge segment setting unit
7 correction unit
8 contraction unit
9 adjacent pixel adding unit
11 first mask generation unit
12 occupancy rate calculation unit
13 edge line start/end coordinates
14 outline data
15 outline data
16 occupancy rate data
21 control unit
22 main storage
23 external storage
24 operation unit
25 display unit
26 input/output unit
30 program
100 drawing device 104 edge generation circuit
106 outline buffer
120 display circuit

The invention claimed is:

1. A figure drawing device comprising:
a pixel division array generation unit generating an array of pixel divisions by dividing a pixel through which an edge line of a figure runs by a given number in the horizontal and vertical directions;
an edge data setting unit setting up edge data for the array of pixel divisions generated by said pixel division array generation unit, the edge data presenting a pixel division at which filling starts and a pixel division at which the filling ends along the scanning line of a drawing region;
a pixel division row shifting unit shifting the array of pixel divisions for which said edge data are set up by said edge data setting unit in the direction of said scanning line on the basis of row of pixel divisions arranged in the direction of said scanning line by a given number of pixel divisions determined for said row of pixel divisions;
a contracted pixel column generation unit calculating the sums of said edge data of pixel divisions on the basis of said row of pixel divisions within the pre-shift range of said array of pixel divisions in a set of pixel divisions shifted by said pixel division row shifting unit, and generating a column of contracted pixels storing said sums of edge data, said column of contracted pixels having a width equal to one pixel in the direction of said scanning line and consisting of the number of contracted pixels obtained by dividing in the direction perpendicular to said scanning line;
a mask pixel array generation unit generating an array of mask pixels indicating the contracted pixels to be filled from an array of contracted pixels obtained by arranging said columns of contracted pixels generated by said contracted pixel column generation unit according to the array of undivided pixels;
an occupancy rate calculation unit calculating the fill occupancy rate of a pixel through which said edge line corresponding to said column of contracted pixels runs from the sum of the products of the column of contracted pixels and adjacent columns of contracted pixels and given weighting coefficients for individual contracted pixels together on the basis of column of contracted pixels of said array of mask pixels generated by said mask pixel array generation unit;
a figure drawing unit filling the pixels within said figure with a first gradation and filling the pixels through which said edge line runs with a second gradation that is lower than the first gradation and determined according to the occupancy rate calculated by said occupancy rate calculation unit so as to draw the figure on a display screen.

2. The figure drawing device according to claim 1, further comprising a pixel division value adding unit adding the values of pixel divisions protruding from the pre-shift range of said array of pixel divisions as a result of shifting in the direction of said scanning line by said pixel division row shifting unit to the columns of contracted pixels generated by said contracted pixel column generation unit for the adjacent pixel in the direction said row of pixel divisions protrudes,
wherein said mask pixel array generation unit generates an array of mask pixels indicating the contracted pixels to be filled from the array of contracted pixels obtained by arranging said columns of contracted pixels generated by said contracted pixel column generation unit and said pixel division value adding unit according to the array of undivided pixels.

3. The figure drawing device according to claim 1, further comprising an edge start/end point acquisition unit acquiring the coordinates of start and end points of a segment of said edge line that runs through a pixel through which said edge line of a figure runs,
wherein said edge data setting unit sets up edge data presenting a pixel division at which filling starts and a pixel division at which the filling ends along the scanning line of a drawing region in the array of pixel divisions generated by said pixel division array generation unit based on the coordinates of start and end points of the segment of said edge line obtained by said edge start/end point acquisition unit.

4. The figure drawing device according to claim 1, wherein:
said pixel division array generation unit divides a pixel through which said edge line runs into quarters in each of the horizontal and vertical directions; and
said pixel division row shifting unit shifts said rows of pixel divisions on the basis of row by one pixel division in the negative direction and positive direction of said scanning line.

5. The figure drawing device according to claim 4, wherein said occupancy rate calculation unit divides the total of:
the sum of the respective products of the contracted pixels of the column of contracted pixels adjacent to said column of contracted pixels in the negative direction of the scanning line and 0, 0.5, 0, 0.5;
the sum of the respective products of the contracted pixels of said column of contracted pixels and 1.0, 1.5, 1.5, 1.0; and
the sum of the respective products of the contracted pixels of the column of contracted pixels adjacent to said column of contracted pixels in the positive direction of the scanning line and 0.5, 0, 0.5, 0
by 7 to obtain the fill occupancy rate of the pixel.

6. An anti-aliasing method comprising:
a pixel division array generation step generating an array of pixel divisions by dividing a pixel through which an edge line of a figure runs by a given number in the horizontal and vertical directions;
an edge data setting step setting up edge data for the array of pixel divisions generated in said pixel division array generation step, the edge data presenting a pixel division at which filling starts and a pixel division at which the filling ends along the scanning line of a drawing region;
a pixel division row shifting step shifting the array of pixel divisions for which said edge data are set up in said edge data setting step in the direction of said scanning line on the basis of row of pixel divisions arranged in the direction of said scanning line by a given number of pixel divisions determined for said row of pixel divisions;
a contracted pixel column generation step calculating the sums of said edge data of pixel divisions on the basis of said row of pixel divisions within the pre-shift range of said array of pixel divisions in a set of pixel divisions shifted in said pixel division row shifting step, and generating a column of contracted pixels storing said sums of edge data, said column of contracted pixels having a width equal to one pixel in the direction of said scanning line and consisting of the number of contracted pixels obtained by dividing in the direction perpendicular to said scanning line;
a mask pixel array generation step generating an array of mask pixels indicating the contracted pixels to be filled from an array of contracted pixels obtained by arranging said columns of contracted pixels generated in said contracted pixel column generation step according to the array of undivided pixels;

an occupancy rate calculation step calculating the fill occupancy rate of a pixel through which said edge line corresponding to said column of contracted pixels runs from the sum of the products of the column of contracted pixels and adjacent columns of contracted pixels and given weighting coefficients for individual contracted pixels together on the basis of column of contracted pixels of said array of mask pixels generated in said mask pixel array generation step;

a figure drawing step filling the pixels within said figure with a first gradation and filling the pixels through which said edge line runs with a second gradation that is lower than the first gradation and determined according to the occupancy rate calculated in said occupancy rate calculation step so as to draw the figure on a display screen.

7. The anti-aliasing method according to claim 6, further comprising a pixel division value adding step adding the values of pixel divisions protruding from the pre-shift range of said array of pixel divisions as a result of shifting in the direction of said scanning line in said pixel division row shifting step to the columns of contracted pixels generated in said contracted pixel column generation step for the adjacent pixel in the direction said row of pixel divisions protrudes, wherein said mask pixel array generation step generates an array of mask pixels indicating the contracted pixels to be filled from the array of contracted pixels obtained by arranging said columns of contracted pixels generated in said contracted pixel column generation step and said pixel division value adding step according to the array of undivided pixels.

8. The anti-aliasing method according to claim 6, further comprising an edge start/end point acquisition step acquiring the coordinates of start and end points of a segment of said edge line that runs through a pixel through which said edge line of a figure runs, wherein said edge data setting step sets up edge data presenting a pixel division at which filling starts and a pixel division at which the filling ends along the scanning line of a drawing region in the array of pixel divisions generated in said pixel division array generation step based on the coordinates of start and end points of the segment of said edge line obtained in said edge start/end point acquisition step.

9. The anti-aliasing method according to claim 6, wherein:
said pixel division array generation step divides a pixel through which said edge line runs into quarters in each of the horizontal and vertical directions; and
said pixel division row shifting step shifts said rows of pixel divisions on the basis of row by one pixel division in the negative direction and positive direction of said scanning line.

10. The anti-aliasing method according to claim 9, wherein said occupancy rate calculation step divides the total of:
the sum of the respective products of the contracted pixels of the column of contracted pixels adjacent to said column of contracted pixels in the negative direction of the scanning line and 0, 0.5, 0, 0.5;

the sum of the respective products of the contracted pixels of said column of contracted pixels and 1.0, 1.5, 1.5, 1.0; and the sum of the respective products of the contracted pixels of the column of contracted pixels adjacent to said column of contracted pixels in the positive direction of the scanning line and 0.5, 0, 0.5, 0 by 7 to obtain the fill occupancy rate of the pixel.

11. A non-transitory computer-readable storage medium storing programs that allow a computer to execute:

a pixel division array generation procedure generating an array of pixel divisions by dividing a pixel through which an edge line of a figure runs by a given number in the horizontal and vertical directions;

an edge data setting procedure setting up edge data for the array of pixel divisions generated in said pixel division array generation procedure, the edge data presenting a pixel division at which filling starts and a pixel division at which the filling ends along the scanning line of a drawing region;

a pixel division row shifting procedure shifting the array of pixel divisions for which said edge data are set up in said edge data setting procedure in the direction of said scanning line on the basis of row of pixel divisions arranged in the direction of said scanning line by a given number of pixel divisions determined for said row of pixel divisions;

a contracted pixel column generation procedure calculating the sums of said edge data of pixel divisions on the basis of said row of pixel divisions within the pre-shift range of said array of pixel divisions in a set of pixel divisions shifted in said pixel division row shifting procedure, and generating a column of contracted pixels storing said sums of edge data, said column of contracted pixels having a width equal to one pixel in the direction of said scanning line and consisting of the number of contracted pixels obtained by dividing in the direction perpendicular to said scanning line;

a mask pixel array generation procedure generating an array of mask pixels indicating the contracted pixels to be filled from an array of contracted pixels obtained by arranging said columns of contracted pixels generated in said contracted pixel column generation procedure according to the array of undivided pixels;

an occupancy rate calculation procedure calculating the fill occupancy rate of a pixel through which said edge line corresponding to said column of contracted pixels runs from the sum of the products of the column of contracted pixels and adjacent columns of contracted pixels and given weighting coefficients for individual contracted pixels together on the basis of column of contracted pixels of said array of mask pixels generated in said mask pixel array generation procedure;

a figure drawing procedure filling the pixels within said figure with a first gradation and filling the pixels through which said edge line runs with a second gradation that is lower than the first gradation and determined according to the occupancy rate calculated in said occupancy rate calculation procedure so as to draw the figure on a display screen.

* * * * *